United States Patent [19]
Cole

[11] Patent Number: 4,595,368
[45] Date of Patent: Jun. 17, 1986

[54] INSTRUCTIONAL APPARATUS FOR UNDERWATER WELDING

[76] Inventor: Edgar C. Cole, 724 B St., Taft, Calif. 93268

[21] Appl. No.: 759,871

[22] Filed: Jul. 29, 1985

[51] Int. Cl.⁴ .................. G09B 19/24; G23K 9/00
[52] U.S. Cl. .................................. 434/234; 219/72; 219/137 R
[58] Field of Search ............... 434/234; 219/72, 137

[56] References Cited

U.S. PATENT DOCUMENTS

| | | | |
|---|---|---|---|
| 2,985,129 | 5/1961 | Kirkpatrick | 219/72 X |
| 3,360,629 | 12/1967 | Bridoux et al. | 219/72 |
| 3,866,011 | 2/1975 | Cole | 219/72 |
| 3,867,769 | 2/1975 | Schow et al. | 434/234 |

FOREIGN PATENT DOCUMENTS 182810  11/1966  U.S.S.R. .................. 219/72

Primary Examiner—William H. Grieb
Attorney, Agent, or Firm—Sellers and Brace

[57] ABSTRACT

Disclosed herein is an instructional apparatus for underwater electric welding. The workpiece to be welded is clampable to a submergible bench mounted in a water tank on a power adjustable bench controllable by the trainee's feet while his hands are located in gloves mounted in the tank wall. Foot controlled valve and water pump auxiliaries enable the trainee to free his hands from the gloves quickly by dumping the water and to refill the tank after he has replaced his hands in the gloves. Pilot lights indicate the energized or non-energized condition of each auxiliary.

9 Claims, 3 Drawing Figures

INSTRUCTIONAL APPARATUS FOR UNDERWATER WELDING

This invention relates to a welding apparatus, and more particularly to an improved instructional training device for making underwater welds while the trainee remains in dry clothing and conveniently positioned relative to a plurality of foot-controlled auxiliaries.

BACKGROUND OF THE INVENTION

There is today an ever increasing need for conducting welding operations underwater. Examples include servicing and repair of dock facilities, drilling and operational platforms for recovering petroleum and gas from below sea beds, ship repair, the construction and repair of submerged pipes, and many others. To meet the need for training welders for making underwater welds for this highly specialized activity, I have previously proposed a portable instructional apparatus usable in the classroom by students in dry clothing as disclosed in my U.S. Pat. No. 3,866,011, granted Feb. 11, 1975. The initial attempts made to meet the needs of this new training technique represent very substantial improvements over prior techniques but is subject to certain deficiencies and shortcomings obviated by the present invention, as will become evident from the foregoing detailed description of my improved training welder.

SUMMARY OF THE INVENTION

The improved underwater welding trainer herein disclosed is fully automated with all auxiliaries provided with separate foot controls conveniently mounted for manipulation by the trainee while positioned in a comfortable welding position in front of the tank containing the submerged workpiece and with his hands enclosed in submerged gloves. The main water tank containing the workbench overlies a storage tank for the water in the welding tank and in communication therewith through a solenoid controlled dump valve. The bench supporting the workpiece is adjustable and insulated from a power-driven rack-and-pinion height adjusting auxiliary. This auxiliary is equipped with safety means for automatically limiting the lowering and raising of the bench. Separate foot switches for each auxiliary enable the operator to manipulate each auxiliary at will while his hands are held captive in the submerged gloves sealed to the tank wall. Likewise the foot control for the water dump valve enables him to quickly release his hands from the gloves by opening this valve and relieve the water pressure exteriorly of his gloves.

Accordingly, it is the primary object of this invention to provide an improved underwater welding instructional apparatus enabling a trainee to obtain experience in underwater welding in a safe and dry operating environment.

Another object of the invention is the provision of an improved portable underwater welding apparatus equipped with independently foot-operated auxiliaries together with a pilot means for indicating the operating state of each auxiliary.

Another object of the invention is to provide a portable underwater instructional apparatus having a workpiece bench readily adjustable to any desired submerged height while the operator's hands are positioned in gloves mounted in the tank wall.

Another object of the invention is the provision of an underwater instructional welding apparatus having a workbench positioned in a flooded tank and supported by foot-controlled rack and pinion adjusting means.

These and other more specific objects will appear upon reading the following specification and claims and upon considering in connection therewith the attached drawing to which they relate.

Referring now to the drawing in which a preferred embodiment of the invention is illustrated:

Figure 1:
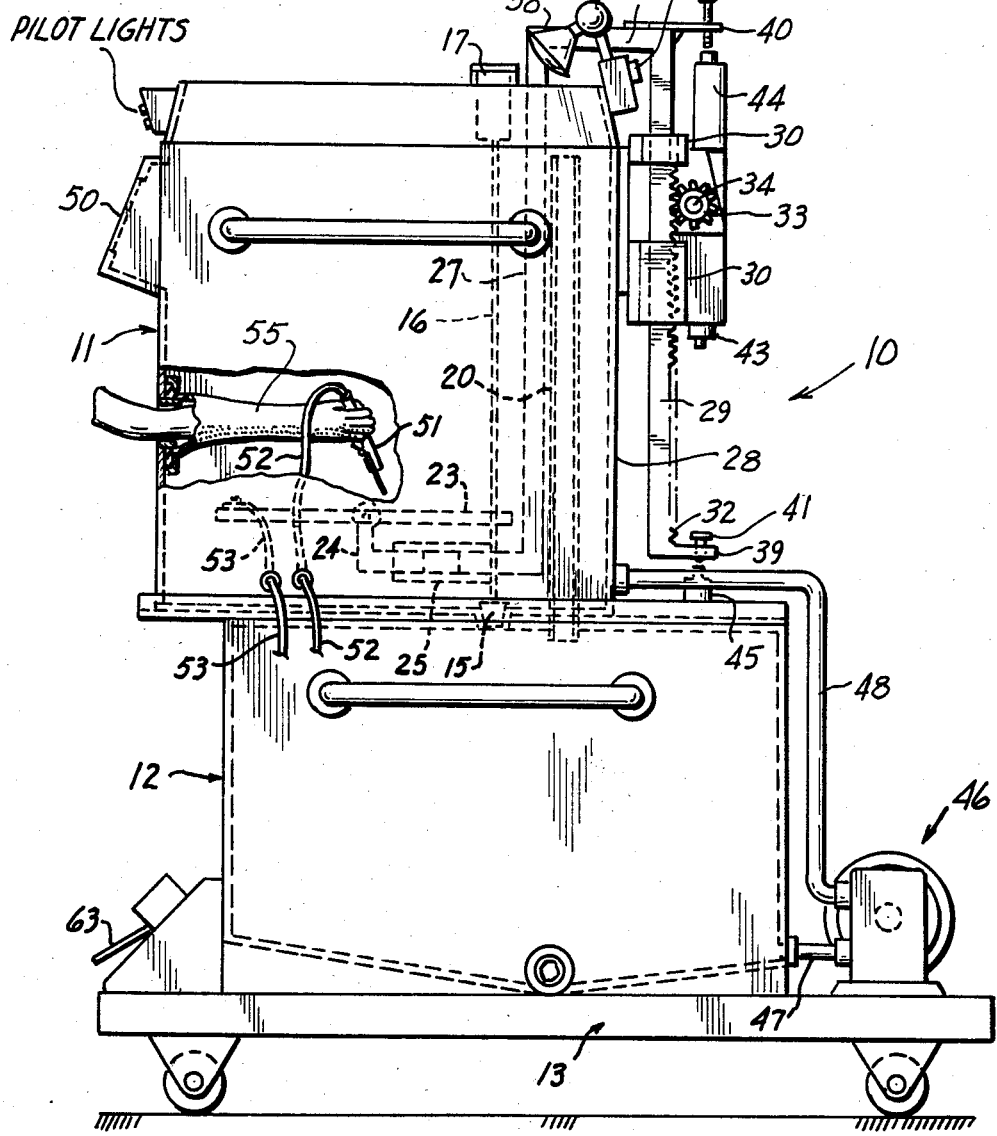
FIG. 1 is a side elevational view of an illustrative embodiment of the invention with a portion of the tank wall broken away.

Referring initially to FIG. 1, there is shown an illustrative embodiment of the training apparatus, designated generally 10, having an upper tank 11 mounted on a reservoir 12 supported by a wheeled chassis 13. The two tanks are in communication with one another through a normally closed large capacity dump valve 15 connected by a tie rod 16 to a solenoid 17 operable when energized to open the dump valve. When not energized, the dump valve firmly seats. The two tanks are also in communication with one another through an overflow standpipe 20 mounted in the bottom of tank 11 and discharging into the top of the lower tank 12 should the water level in the upper tank rise above the upper end of the standpipe.

The workpiece or pieces to be welded are supported on a metallic bench 23 clampable in different tilted positions on a bracket 24. The horizontal leg of this bracket is connected by an insulating coupling sleeve 25 to the lower end of an inverted U-shaped support 27 which is mounted astride the back wall 28 of tank 11. The outer leg 29 of member 27 is formed with rack teeth and is reciprocally supported in a pair of tubular brackets rigidly secured to the rear wall of the tank. The rack teeth 32 mesh with a pinion 33 mounted on the shaft of a reversible motor 36 (FIG. 2) suitably supported on the back wall of 28 of the tank.

The workbench supporting member 27 is equipped with a pair of brackets 39, 40 at the opposite ends of its outer leg which brackets support adjustable stop screws 41, 42 operable to open a respective normally closed limit switch 43, 44 if the operator depresses either of the foot controls for motor 36 too long.

A motor driven pump 46 has its inlet connected to the bottom of the tank by a pipe 47 and its outlet connected to the upper tank 11 by conduit 48.

Tank 11 is provided with a water-tight viewing window conveniently positioned to enable the trainee to view the workpiece and electrode holder or stinger 51. The latter is connected in a circuit with a flexible lead 52. The other side of the welding circuit is completed by an insulated conductor 53 connected to the workbench 23. These two leads are connected to a suitable source of electrical power in a manner well-known to persons skilled in the electrical welding art.

Figure 2:
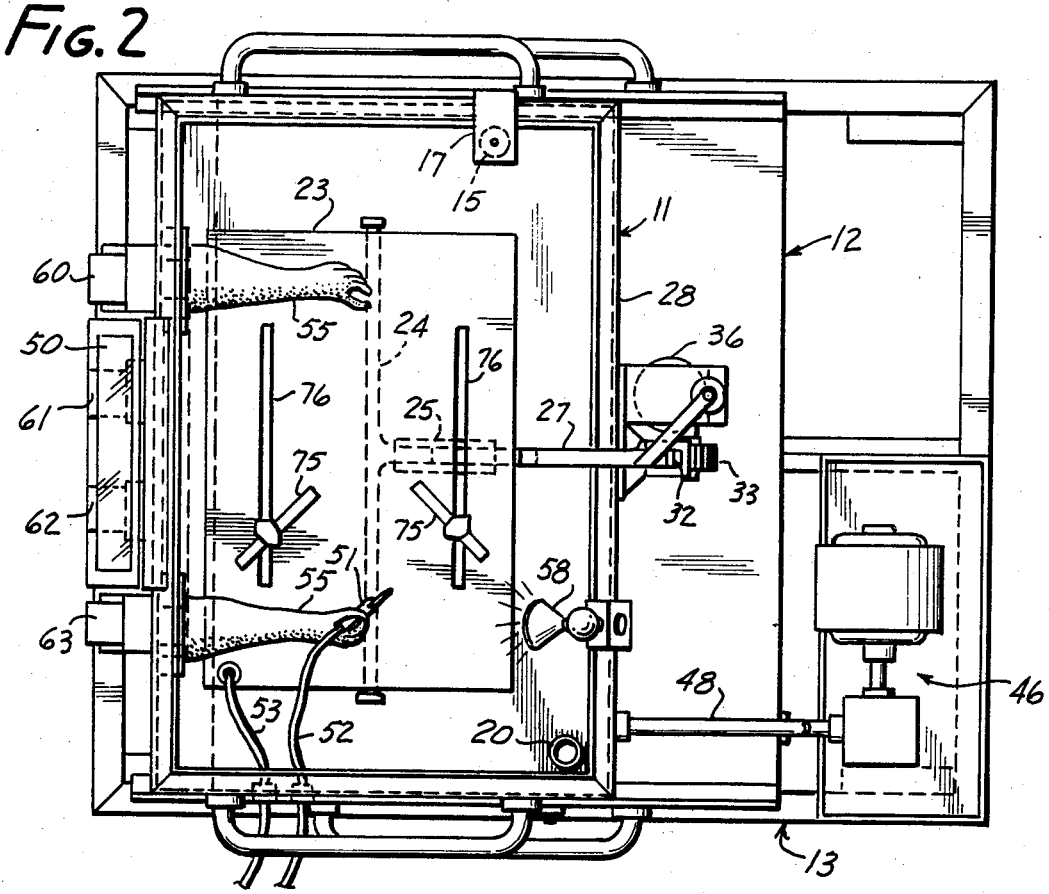
FIG. 2 is a top plan view of FIG. 1.

As is shown in FIGS. 1 and 2, the front wall of the tank 11 is equipped with a pair of rubber gloves 55 sufficiently long to enclose the trainee's hands and forearms and having their open rear ends suitably sealed to openings in the front wall of the tank. Another accessory includes a flood lamp 58 mounted in a universal joint 59 secured to the upper rim of tank 11 by a suitable bracket equipped with a manually operable switch 60.

Figure 3:
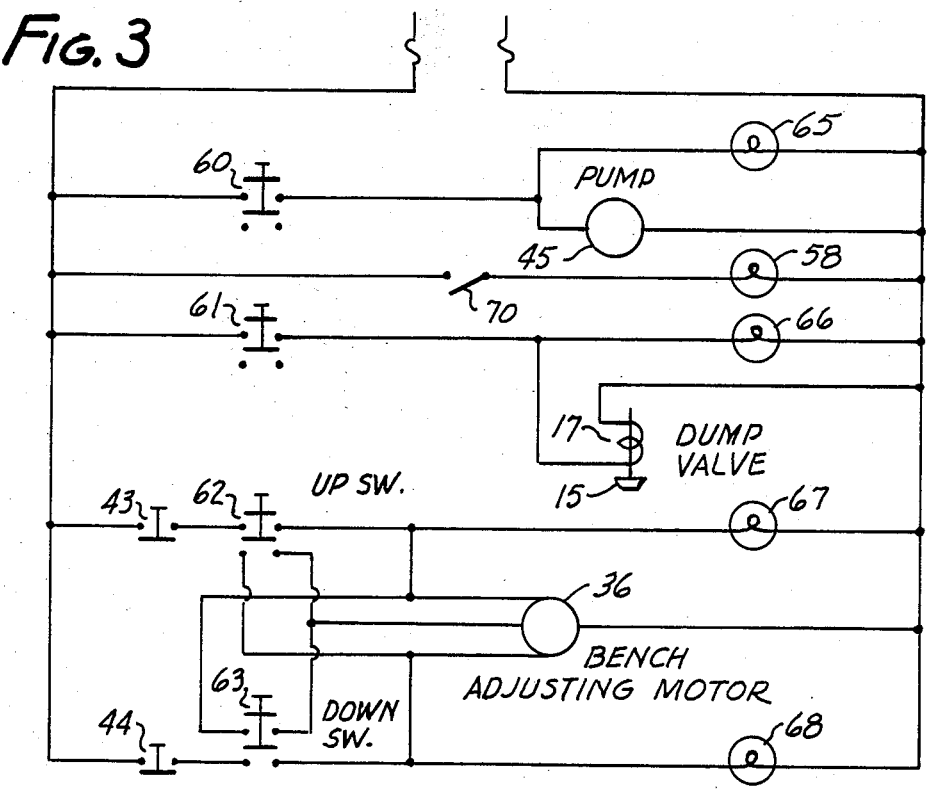
FIG. 3 is a schematic of the electrical auxiliaries.

The several auxiliaries of the welder are connected in an electric circuit illustrated in FIG. 3. This circuit includes four normally open foot-operated switches 60, 61, 62, 63 mounted across the forward end of the apparatus chassis 13. Foot switch 60 controls the operation of the motor-driven pump 45 and the associated pilot light 65. Switch 61 controls the operation solenoid 17 for dump valve 15 and its pilot light 66. Switches 62 and 63 control the operation of the reversible motor 36 operable to raise and lower bench 23 to any desired height, as well as to activate the appropriate one of the pilot lights 67, 68 to indicate the direction of drive. Manual switch 70 is connected in circuit with flood lamp 58 and switch 73 is a main power switch in circuit with the bench adjusting motor 36.

The operation of apparatus 10 will be quite apparent from the foregoing detailed description of its construction. While an adequate supply of water is present in the lower tank 12, the operator adjusts a workpiece to be welded on bench 23 utilizing the clamps 75 well-known to persons in the clamping art to anchor the workpiece firmly to the bench, it being recognized that the clamps are rotatable and shiftable to any desired position along the slots 76 in the bench. The stinger or electrode holder 51 is equipped with an electrode and the operator inserts his hands in the two gloves 55 and is then ready to transfer water in the lower tank 12 to the upper tank 11, an operation accomplished simply by utilizing his foot to hold the foot switch 60 depressed until the tank is filled. He then utilizes his foot to operate either switch 62 or 63 to raise or lower the bench to a convenient height to begin a welding operation and proceeds to weld while viewing the workpiece through window 50 with the aid of illumination provided by flood lamp 58. As work proceeds, he may wish to adjust the bench by either closing switch 62 or 63 until the bench is in a desired new position.

If at any time an emergency should arise, the operator can close switch 61 with his foot to activate the dump valve 15 whereupon the large area valve quickly releases the water into the lower tank 12 until the trainee's gloves 55 are exposed or substantially exposed thereby permitting him to withdraw his hands from the gloves. While the gloves are submerged in water, it is virtually impossible to remove the hands but there is no problem once the water level has been lowered. There is no risk of adjusting the bench 23 beyond a safe level because the upper and lower limit switches 43, 44 automatically deactivate the power supply to motor 36 even though one or the other of main switches 62, 63 is maintained closed by the operator's foot.

While the particular improved instructional apparatus for underwater welding herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. Apparatus for use by a trainee to make underwater electric welds comprising:
   an open water tank having a welding station and a workpiece bench;
   electrically powered reversible means exteriorly of said tank and electrically insulated from said workpiece bench for adjusting said workpiece bench to support a workpiece at a desired submerged height and including foot operated control means therefor;
   the sidewall of said tank having a pair of rubber gloves with the inlets thereof opening through and sealed to said sidewall; and
   an electric welding stinger within said tank connectible by an insulated power lead to a source of welding power.

2. Training apparatus as defined in claim 1 characterized in the provision of a foot-controlled solenoid valve mounted in a water outlet for said tank and operable to empty said tank even though the trainee's hands are located within said gloves.

3. Training apparatus as defined in claim 2 characterized in the provision of a water reservoir at a lower level than said water tank and in communication with said water outlet; and foot-controlled pump means for transferring water from said reservoir into said water tank to any desired level.

4. Training apparatus as defined in claim 1 characterized in that said bench support includes an inverted V-shaped bracket slidably supported astride a sidewall of said water tank with the leg thereof exteriorly of said tank provided with rack teeth in mesh with a pinion on the shaft of a reversible motor; and foot-operated reversing switch means controlling the operation of said motor.

5. Training apparatus as defined in claim 4 characterized in that said workpiece bench is pivotably supported on the lower end of the leg of said V-shaped bracket located inside said tank.

6. Training apparatus as defined in claim 1 characterized in the provision of flood lamp means for illuminating the area overlying said workpiece bench when in an operating position inside said water tank; and means for controlling the operation of said flood lamp means.

7. Training apparatus as defined in claim 3 characterized in the provision of pilot light means positioned for convenient observation by a trainee using said apparatus and operable to indicate the energized or non-energized condition of said reversible means for said workpiece, said solenoid valve and said pump means.

8. Training apparatus as defined in claim 7 characterized in that said apparatus is a self-contained unitary assembly supported on a wheel-equipped chassis.

9. Training apparatus as defined in claim 1 characterized in the provision of means for automatically deactivating said reversible means for adjusting the position workpiece bench at two predetermined levels relative to the top of said water tank.

* * * * *